US010496621B2

(12) United States Patent
Oks et al.

(10) Patent No.: US 10,496,621 B2
(45) Date of Patent: *Dec. 3, 2019

(54) COLUMNAR STORAGE OF A DATABASE INDEX

(71) Applicant: Microsoft Technology Licensing, LLC, Redmond, WA (US)

(72) Inventors: Artem A. Oks, Bellevue, WA (US); Per-Ake Larson, Redmond, WA (US); Srikumar Rangarajan, Samamish, WA (US); Michael James Zwilling, Bellevue, WA (US); Jose A. Blakeley, Redmond, WA (US); Hanumantha R. Kodavalla, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 127 days.

This patent is subject to a terminal disclaimer.

(21) Appl. No.: 14/921,239

(22) Filed: Oct. 23, 2015

(65) Prior Publication Data

US 2016/0042019 A1 Feb. 11, 2016

Related U.S. Application Data

(63) Continuation of application No. 12/719,015, filed on Mar. 8, 2010, now Pat. No. 9,195,657.

(51) Int. Cl.
*G06F 16/22* (2019.01)
*G06F 16/00* (2019.01)
*G06F 16/215* (2019.01)
*G06F 16/28* (2019.01)

(52) U.S. Cl.
CPC ............ *G06F 16/221* (2019.01); *G06F 16/00* (2019.01); *G06F 16/215* (2019.01); *G06F 16/282* (2019.01)

(58) Field of Classification Search
CPC .................................................... G06F 16/221
USPC ....... 707/703, 736, 758, 781, 769, 791–793, 707/797, 801, 802
See application file for complete search history.

(56) References Cited

U.S. PATENT DOCUMENTS

| 2006/0209840 A1 | 9/2006 | Paatela et al. |
| 2007/0050381 A1 | 3/2007 | Hu et al. |
| 2008/0071748 A1 | 3/2008 | Wroblewski et al. |
| 2009/0193006 A1 | 7/2009 | Herrnstadt |
| 2009/0240663 A1 | 9/2009 | Plattner et al. |

(Continued)

OTHER PUBLICATIONS

Werther, Ben, "Beyond Rows and Columns: Greenplum's Polymorphic Data Storage-Part 1", Retrieved on: Jan. 8, 2010, Available at: http://web.archive.org/web/20100330101418/http://www.greenplum.com/news/248/231/Beyond-Rows-and-Columns-Greenplum-s-Polymorphic-Data-Storage----Part-1/d,blog, 2 pages.

(Continued)

*Primary Examiner* — Syling Yen
(74) *Attorney, Agent, or Firm* — Newport IP, LLC; Mike R. Cicero (57) ABSTRACT

Methods, systems, and computer-readable media of columnar storage of a database index are disclosed. A particular columnar index includes a column store that stores rows of the columnar index in a column-wise fashion and a delta store that stores rows of the columnar index in a row-wise fashion. The column store also includes an absence flag array. The absence flag array includes entries that indicate whether certain rows have been logically deleted from the column store.

22 Claims, 7 Drawing Sheets

(56) References Cited

U.S. PATENT DOCUMENTS

| | | | | |
|---|---|---|---|---|
| 2010/0235335 | A1* | 9/2010 | Heman | G06F 17/30345 |
| | | | | 707/703 |
| 2011/0113048 | A1* | 5/2011 | Njemanze | G06F 7/02 |
| | | | | 707/755 |
| 2014/0250090 | A1* | 9/2014 | Faerber | H03M 7/30 |
| | | | | 707/693 |

OTHER PUBLICATIONS

"Column-Oriented DBMS", Retrieved on: Jan. 8, 2010, Available at: http://en.wikipedia.org/wiki/Column-oriented_DBMS, 4 pages.

"Convert Columns to Rows, or Rows to Columns", Retrieved on: Jan. 8, 2010, Available at: http://web.archive.org/web/20100108143836/http://office.microsoft.com/en-us/excel/HP052031381033.aspx, 3 pages.

"What is InfiniDB", Retrieved on: Jan. 8, 2010, Available at: http://infinidb.org/resources/what-is-infinidb, 2 pages.

Jeff, Kelly, "Data Management/BI News", Published on: May 29, 2008, Available at: http://searchdatamanagement.techtarget.com/news/article/0,289142,sid91_gci1315359,00.html, 3 pages.

Stonebraker, et al., "C-store: A Column-Oriented DBMS", In Proceedings of the 31st International Conference on Very Large Data Bases, Aug. 30, 2005, 12 Pages.

"Non-Final Office Action Issued in U.S. Appl. No. 12/719,015", dated Nov. 8, 2011, 21 Pages.

"Final Office Action Issued in U.S. Appl. No. 12/719,015", dated Mar. 5, 2012, 28 Pages.

"Amendment Issued in U.S. Appl. No. 12/719,015", dated Feb. 8, 2012, 10 Pages.

"Amendment Issued in U.S. Appl. No. 12/719,015", dated Jul. 5, 2012, 11 Pages.

"Amendment Issued in U.S. Appl. No. 12/719,015", dated Apr. 14, 2014, 13 Pages.

"Amendment Issued in U.S. Appl. No. 12/719,015", dated Jul. 23, 2014, 14 Pages.

"Amendment Issued in U.S. Appl. No. 12/719,015", dated Jun. 23, 2015, 8 Pages.

"Final Office Action Issued in U.S. Appl. No. 12/719,015", dated Apr. 25, 2014, 52 Pages.

"Non-Final Office Action Issued in U.S. Appl. No. 12/719,015", dated Jan. 14, 2014, 34 Pages.

"Non-Final Office Action Issued in U.S. Appl. No. 12/719,015", dated Mar. 5, 2015, 53 Pages.

U.S. Appl. No. 12/719,015, Notice of Allowance dated Jul. 21, 2015, 5 pages.

* cited by examiner

COLUMNAR STORAGE OF A DATABASE INDEX

CROSS-REFERENCE TO RELATED APPLICATIONS

This application claims priority to and is a continuation of co-pending U.S. patent application Ser. No. 12/719,015 entitled "Columnar Storage of a Database Index" and filed Mar. 8, 2010, which is incorporated herein by reference.

BACKGROUND

Most database systems store tables and indices in a row-wise fashion. When data and indices are stored in a row-wise fashion, data from multiple columns may be stored adjacently on a per-row basis. Row-wise data storage may be suitable for database queries that involve using data (e.g., reading or writing data) from many columns in only a few rows. On the other hand, data warehouse or data analysis queries that typically access only a few columns over a large number of rows may execute slowly due to the overhead of reading and handling data in columns that are not required by the query.

SUMMARY

A database index where data is stored column-wise is disclosed. Columnar storage of database indices as disclosed herein may provide fast column-wise processing of queries while maintaining compatibility with existing row-based database functions (e.g., transaction management, maintenance, recovery, and replication). A database index that is stored in columnar fashion may include two parts: a column store that stores rows of the database index column-wise and a delta store that stores rows of the index row-wise. Deletions, insertions, and updates to the database index occur in the delta store. Columnar storage of database indices as disclosed herein may be applied to any database index and may support the same database operations as row-wise indices (e.g., insertions, deletions, updates, and scan/search).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In a particular embodiment, a computer system includes a memory storing a columnar index associated with a relational database table. The columnar index includes a column store and a delta store. The column store includes one or more first rows of the columnar index stored in a column-wise fashion and the delta store includes one or more second rows of the columnar index stored in a row-wise fashion. The column store also includes an absence flag array including an entry for each row of the first rows that indicates whether the row has been logically deleted from the column store.

In another particular embodiment, a method includes dividing a database index that includes a plurality of rows and a plurality of columns into a plurality of segments, where each segment includes a set of rows of the database index. The method also includes converting each segment into a plurality of column arrays, including a column array for each of the plurality of columns. The method further includes storing the plurality of column arrays in a column store. The method includes storing an absence flag array in the column store, where each entry of the absence flag array indicates whether a particular row of the database index has been logically deleted from the column store.

In another particular embodiment, a computer-readable medium includes instructions, that when executed by a computer, cause the computer to divide each column of a database index that includes a plurality of rows and a plurality of columns into one or more column arrays. The instructions also cause the computer to store the one or more column arrays in a column store, where the one or more column arrays are stored in a column-wise fashion. The instructions further cause the computer to store an absence flag array in the column store, where each entry of the absence flag array indicates whether a particular row of the database index is absent from the column store. The instructions cause the computer to store data in a delta store including rows of the database stored in a row-wise fashion. Each row of the database index is stored in only one of the column store and the delta store.

Figure 1:
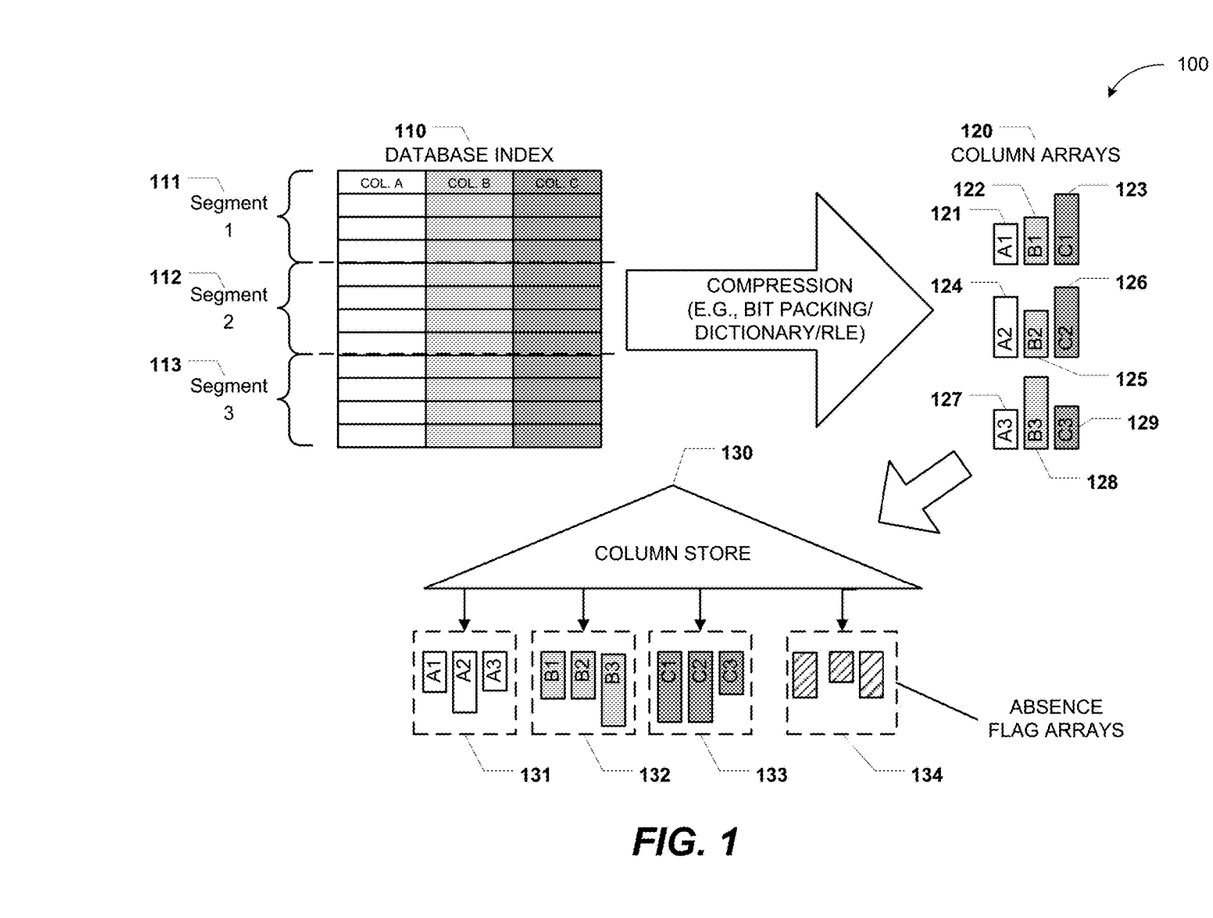
FIG. 1 is a diagram to illustrate a particular embodiment of storing data of a database index at a column store.

FIG. 1 depicts a particular embodiment of a method 100 of storing data of a database index 110 at a column store 130. The database index 110 may include a plurality of rows and a plurality of columns. It should be noted that although the database index 110 illustrated in FIG. 1 includes three columns, data from any size database index may be stored at a column store.

The rows of the database index 110 may be divided into a plurality of segments 111-113. Each segment 111-113 may include a set of rows of the database index 110. The segments 111-113 may be fixed-size or variable-size.

Each of the segments 111-113 may independently be converted into a plurality of column arrays 120. In a particular embodiment, converting the segments 111-113 into the column arrays 120 includes applying one or more compression algorithms to the segments. For example, the compression algorithms may include bit packing, dictionary compression, and run-length encoding (RLE). In a particular embodiment, each column of a segment is compressed into a column array. For example, the first segment 111 may be converted into the column arrays 121-123, the second segment 112 may be converted into the column arrays 124-126, and the third segment 113 may be converted into the column arrays 127-129. It should be noted that due to variations in compression algorithms and the underlying data, the column arrays 121-129 may not all be of the same size.

The plurality of column arrays 120 may be stored in the column store 130 that stores data column-wise. In a particular embodiment, the column store 130 is implemented at a database system using the same underlying storage structures that are used by row-based indices. For example, the column store 130 is associated with a first relational database table and the column arrays of the index are stored as records in a B-tree in the same way as a row-wise index may store rows as records in a B-tree. Column store implementations are further illustrated and described with reference to FIGS. 2-3. Column arrays for each column of the database index 110 may be clustered together in the column store 130. For example, a first cluster 131 may include column arrays representing "Column A" of the database index 110, a second cluster 132 may include column arrays representing "Column B" of the database index 110, and a third cluster 133 may include column arrays representing "Column C" of the database index 110. Clustering column arrays together may improve query processing performance. For example, when column arrays are clustered, a complete column scan (e.g., a scan of "Column A") at the database index 110 may be implemented by a range scan (e.g., a range scan of the column arrays in the first cluster 131) at the column store 130.

The column store 130 also includes absence flag arrays 134, one for each segment. In a particular embodiment, the absence flag array is a bit array or a Boolean array. The absence flag arrays 134 may include an entry (i.e., flag) for each row of the database index 110 that has been logically deleted from the column store 130. In a particular embodiment, a row is logically deleted from the column store 130 when the row is deleted or updated. Thus, the absence flag arrays 134 may indicate rows of the column store 130 that have been updated or deleted. Updates and deletions of rows are further described and illustrated with reference to FIGS. 2-3.

In operation, a database index may be divided into segments and each segment may be converted into compressed column arrays. For example, the database index 110 may be divided into three segments 111-113, and each segment may be converted into a total of nine column arrays 121-129. Each column array may be stored at a column store. For example, the column arrays 121-129 may be stored at the column store 130. The column store 130 may also include the absence flag arrays 134 to identify rows of the database index 110 that have been logically deleted from the column store 130.

It will be appreciated that the method 100 of FIG. 1 may store a database index in column-wise fashion, thereby providing faster execution of database queries that scan many rows but only a few columns. It will also be appreciated that because the column store 130 may be implemented in the same way that row-wise indices are implemented, the column store 130 may leverage existing database storage methods (e.g., heap-based or binary large object (blob)-based storage) and may utilize and support existing database operations (e.g., locking, isolation modes, versioning, replication, mirroring, logging, recovery, and partitioning).

Figure 2:
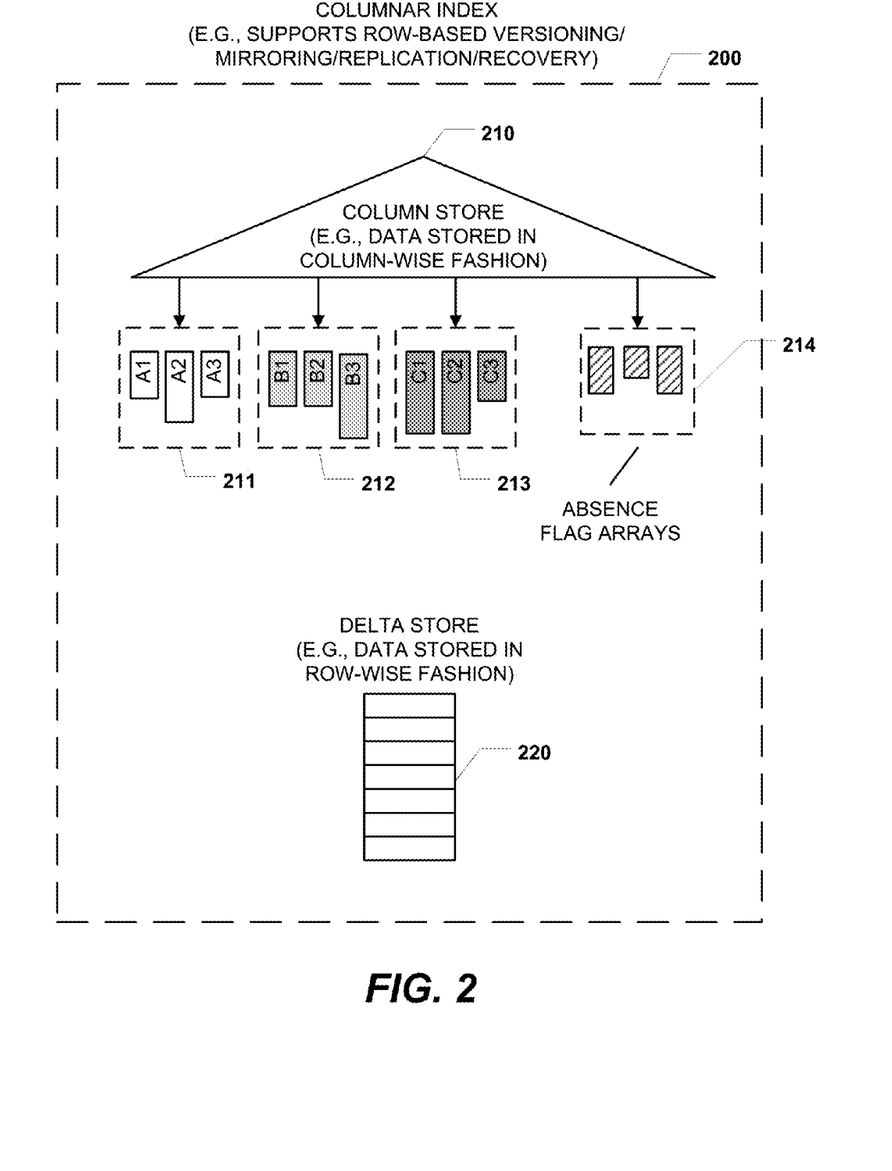
FIG. 2 is a diagram to illustrate a particular embodiment of a columnar index that includes a column store and a delta store.

FIG. 2 depicts a particular embodiment of a columnar index 200 that includes a column store 210 and a delta store 220.

The column store 210 may include column clusters 211-213 and absence flag arrays 214. In an illustrative embodiment, the column store 210 is the column store 130 of FIG. 1, the clusters 211-213 are the clusters 131-133 of FIG. 1, and the absence flag arrays 214 are the absence flag arrays 134 of FIG. 1.

The columnar index 200 may also include a delta store 220 that stores data in a row-wise fashion. For example, the delta store 220 may be implemented in ordered fashion (e.g., as a B-tree) or unordered fashion (e.g., as a heap). The delta store 220 may include rows of the columnar index 200 that have been logically deleted from the column store 210. For example, when all update activity of the columnar index 200 occurs at the delta store 220, the delta store 220 may include rows that have been modified or deleted. Thus, updating or deleting a row of the columnar index may include copying the row from the column store 210 to the delta store 220, marking an entry corresponding to the row at the absence flag arrays 214, and updating or deleting the row at the delta store 220. The delta store 220 may also include newly inserted rows of the columnar index 200. Inserting a row at the columnar index 200 may be performed by inserting the row into the delta store 220. In a particular embodiment, each row of the columnar index 200 is stored in only one of the column store 210 and the delta store 220.

The contents of the delta store 220 may be converted into additional column arrays or may be combined with existing column arrays. For example, rows stored in the delta store 220 may be converted into additional column arrays, the additional column arrays may be stored in the column store 210, and the converted rows may be removed from the delta store 220, thereby "emptying" the delta store 220. The conversion of rows from row-based storage at the delta store 220 to column-based storage at the column store 210 may be triggered by several events. For example, the conversion may be triggered in response to determining that a number of rows in the delta store is greater than a threshold (e.g., one million rows), determining that a time period has elapsed, or receiving a user command (e.g., database administrator command) to perform the conversion.

In operation, update operations, delete operations, and insertion operations may be performed on the columnar index 200. During an update operation, the particular row to be updated may be copied from the column store 210 to the delta store 220, an entry corresponding to the particular row may be marked at the absence flag arrays 214, and the particular row may be updated at the delta store 220. During a delete operation, the particular row to be deleted may be copied into the delta store 220 (e.g., to be able to utilize existing mechanisms for propagation of changes to a replicated database) and an entry corresponding to the particular row may be marked at the absence flag arrays 214. The particular row may then be physically deleted from the delta store 220. During an insertion operation, the particular row to be inserted may be inserted directly into the delta store 220.

It will be appreciated that routing all update activity through a row-based structure, such as the delta store 220, may simplify integration of columnar indices with existing database systems. For example, columnar indices may be integrated without modifying stored procedures at a database system. It will also be appreciated that because moving rows between the column store 210 and the delta store 220 modifies how data is stored but not the data itself, the movement of rows between column-wise and row-wise storage structures may be performed by database system operations that are transparent to a database user.

Figure 3:
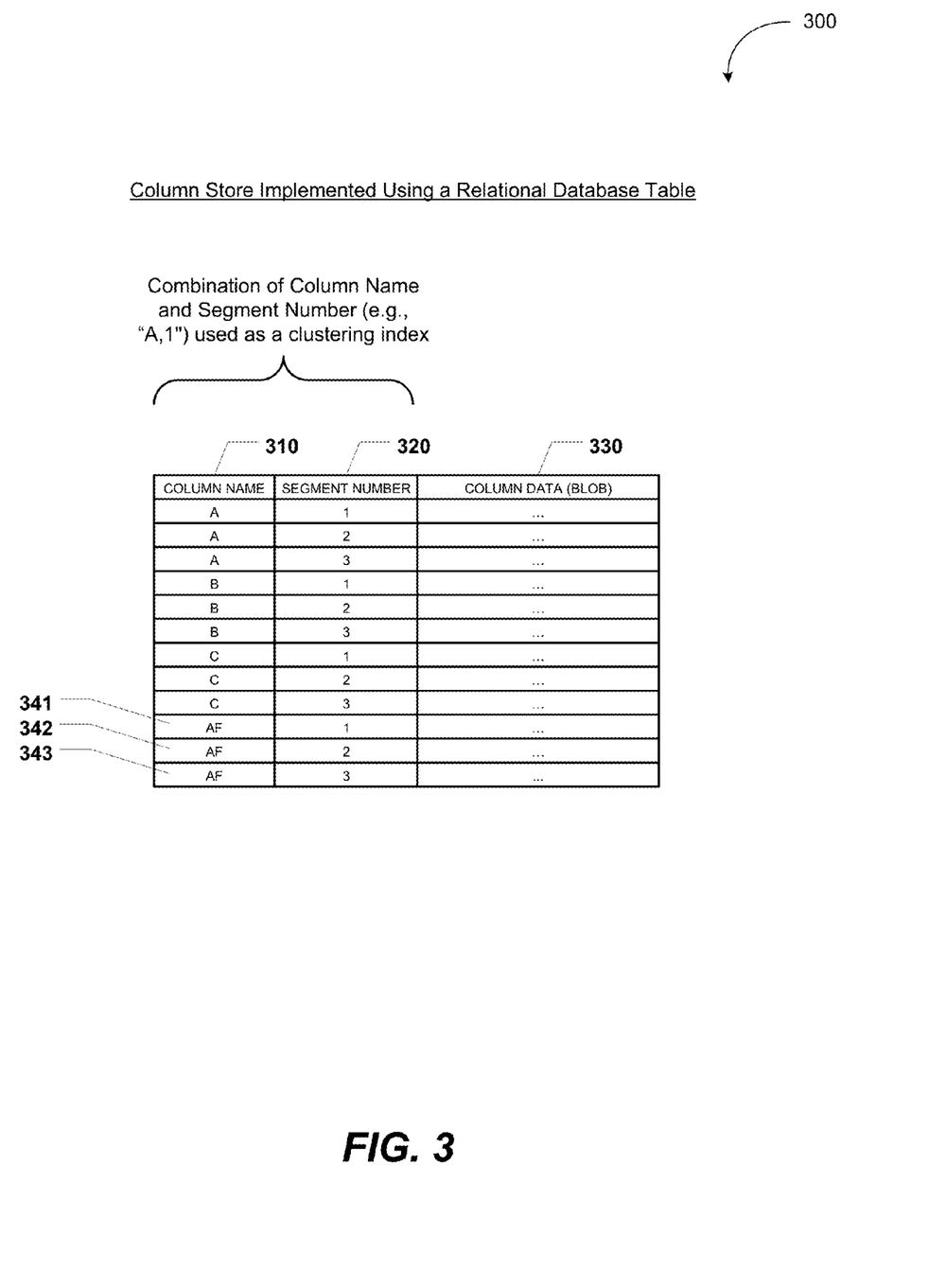
FIG. 3 is a diagram to illustrate a particular embodiment of implementing a column store using a relational database table.

FIG. 3 depicts a particular embodiment of implementing a column store using a relational database table 300. In an illustrative embodiment, the relational database table 300 may be used to implement the column store 130 of FIG. 1 or the column store 210 of FIG. 2. It should be noted that the relational database table 300 used to implement the column store may be different than the relational database table indexed by the columnar index that includes the column store.

Each column array of a column store may be stored as a row of the relational database table 300. For example, each row of the relational database table 300 may include a column identifier (e.g., a column name 310), a segment identifier (e.g., a segment number 320), and a blob 330 that contains the column array.

In a particular embodiment, the column name 310 and the segment number 320 of each row may be combined to form a clustering index for the relational database table 300. Each cluster may include column arrays corresponding to the same column. For example, column arrays corresponding to "Column A," "Column B," and "Column C," respectively, may be clustered together.

The relational database table 300 may also store an absence flags array of the column store. For example, absence flags for each segment may be stored at a separate row of the relational database table (absence flag rows 341, 342, and 343) in the same way as column arrays for other columns.

Figure 4:
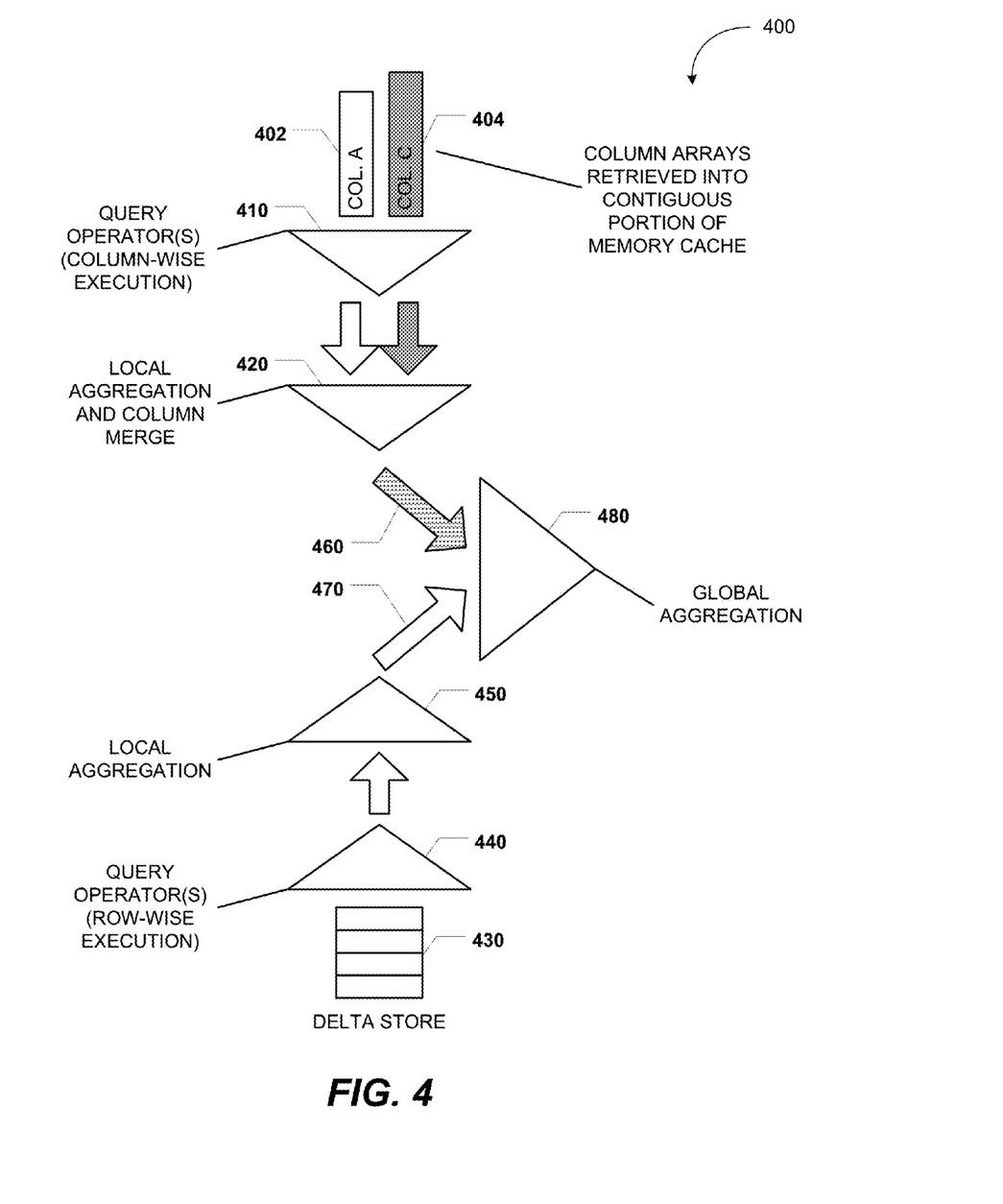
FIG. 4 is a diagram to illustrate a particular embodiment of a method of query execution at a columnar database index.

FIG. 4 depicts a particular embodiment of a method 400 of query execution using a columnar database index. The query may reference one or more columnar indices or may reference a combination of columnar indices and row-wise indices.

Columnar storage of database indices as disclosed herein may provide a performance improvement by implementing methods for column-wise processing of queries (e.g., filtering queries, aggregation queries, and queries that include an equijoin operation between tables). In a particular embodiment, executing a query that references a columnar index includes retrieving and loading each required column of the columnar index's column store into a contiguous portion of a memory cache. For example, the column arrays 402, 404 may be copied into a contiguous portion of memory cache that is reserved as a column array cache. In database systems that include a buffer pool, extra copying may be avoided by directly copying the column arrays 402, 404 into the column array cache.

Executing a query that references a columnar index may involve performing query operators on both column arrays as well as rows stored at a delta store 430 of the columnar index. Because data is stored column-wise in the column store but row-wise in the delta store 430, query execution may be divided into two branches that may be performed simultaneously. In a first branch, query operators 410 of the query may be executed in column-wise fashion with respect to the column arrays 402, 404 at the memory cache. Local aggregation and column merging 420 may be performed on the results of the query operators 410 to yield first partial results 460.

In a second branch, query operators 440 of the query may be executed in row-wise fashion with respect to the rows of the delta store 430. Local aggregation 450 may be performed on the results of the query operators 440 to yield second partial results 470. Global aggregation 480 may be performed to combine the first partial results 460 and the second partial results 470.

In a particular embodiment, instead of separating query execution into branches, the rows of the delta store may be converted into additional column arrays on the fly. In such an embodiment, executing the query may include converting the delta store into one or more additional column arrays and executing the query with respect to the additional column arrays.

Because updating or deleting rows at a columnar index may be performed by simply marking an entry in an absence flag array instead of physically updating or deleting the row from the column store, data from rows that have logically been deleted from the column store may nonetheless be present in the retrieved column arrays 402, 404. In a particular embodiment, executing a query that references a columnar index includes adding a filter predicate to the query (e.g., "Is_absent=FALSE") to eliminate rows that have been logically deleted from the column store.

It will be appreciated that branch processing of queries as illustrated in FIG. 4 may be well-suited to multi-threaded operation at a database system. Multi-threaded execution of a particular query may result in a reduction of the time taken to execute the particular query.

Figure 5:
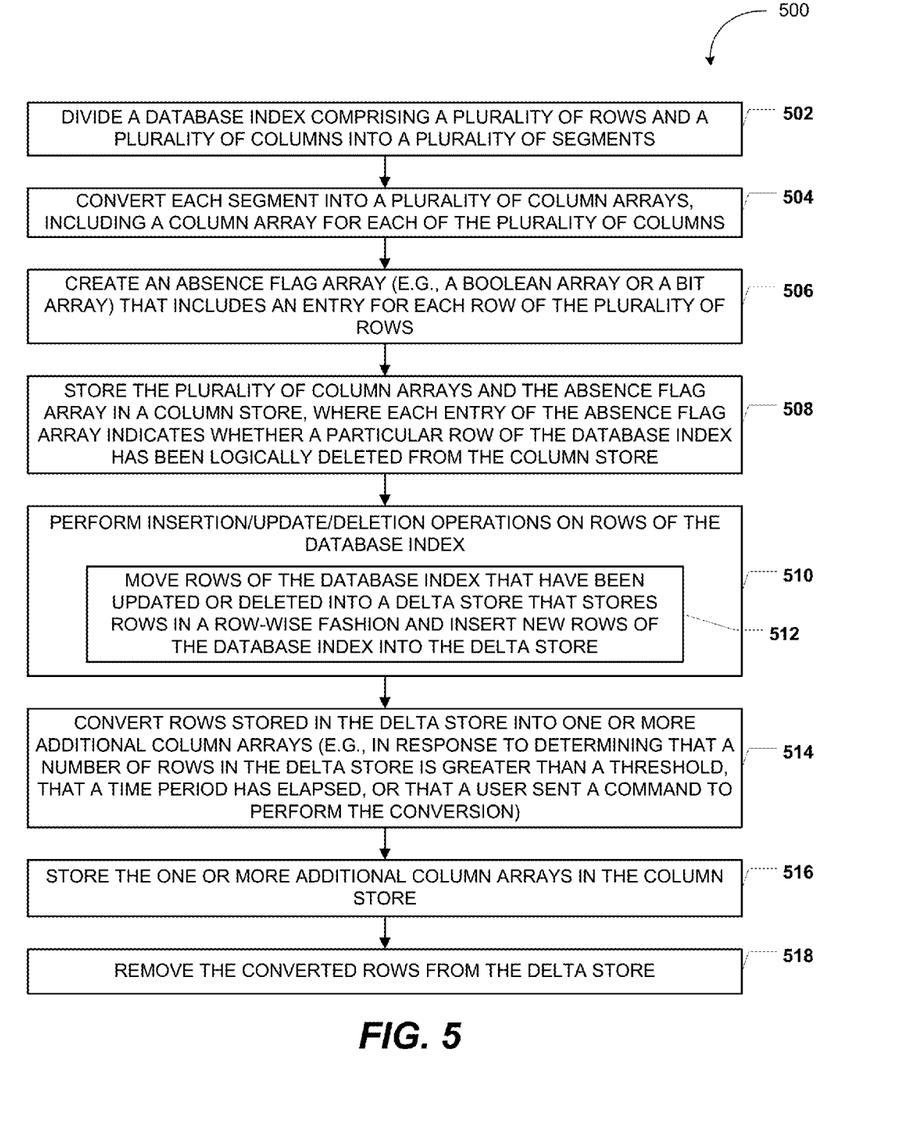
FIG. 5 is flow diagram to illustrate a particular embodiment of a method of columnar storage of a database index.

FIG. 5 depicts a particular embodiment of a method 500 of columnar storage of a database index. In a particular embodiment, operation of the method 500 may be illustrated with reference to FIGS. 1-2.

The method 500 includes dividing a database index that includes a plurality of rows and a plurality of columns into a plurality of segments, at 502. For example, in FIG. 1, the database index 110 may be divided into the segments 111-113. The method 500 also includes converting each segment into a plurality of column arrays, including a column array for each of the plurality of columns, at 504. For example, in FIG. 1, the segments 111-113 may be converted into the plurality of column arrays 120.

The method 500 further includes creating an absence flag array that includes an entry for each row of the plurality of rows, at 506. The absence flag array may be a Boolean array or a bit array. For example, in FIG. 1, the absence flag arrays 134 may be created. The method 500 includes storing the plurality of column arrays and the absence flag array in a column store, at 508. Each entry of the absence flag array indicates whether a particular row of the database index has been logically deleted from the column store. For example, in FIG. 1, the plurality of column arrays 120 and the absence flag arrays 134 may be stored at the column store 130.

The method 500 also includes performing insertion, update, and deletion operations on rows of the database index, at 510. Performing the operations includes moving rows of the database index that have been updated or deleted into a delta store that stores rows in a row-wise fashion and inserting new rows of the database index into the delta store, at 512. For example, inserted, updated, and deleted rows of the database index 110 may be stored at a delta store. In an illustrative embodiment, the delta store is the delta store 220 of FIG. 2. Performing operations on rows of the database index is further described and illustrated with reference to 610-616 of FIG. 6.

The method 500 further includes converting rows stored in the delta store into one or more additional column arrays, at 514. The conversion may be performed in response to determining that a number of rows in the delta store is greater than a threshold, that a time period has elapsed, or that a user sent a command to perform the conversion. For example, in FIG. 2, the rows of the delta store 220 may be converted into one or more additional column arrays.

The method 500 includes storing the one or more additional column arrays in the column store, at 516, and removing the converted rows from the delta store, at 518. For example, in FIG. 2, the additional column arrays may be stored at the column store 210 and the converted rows may be removed from the delta store 220.

Figure 6:
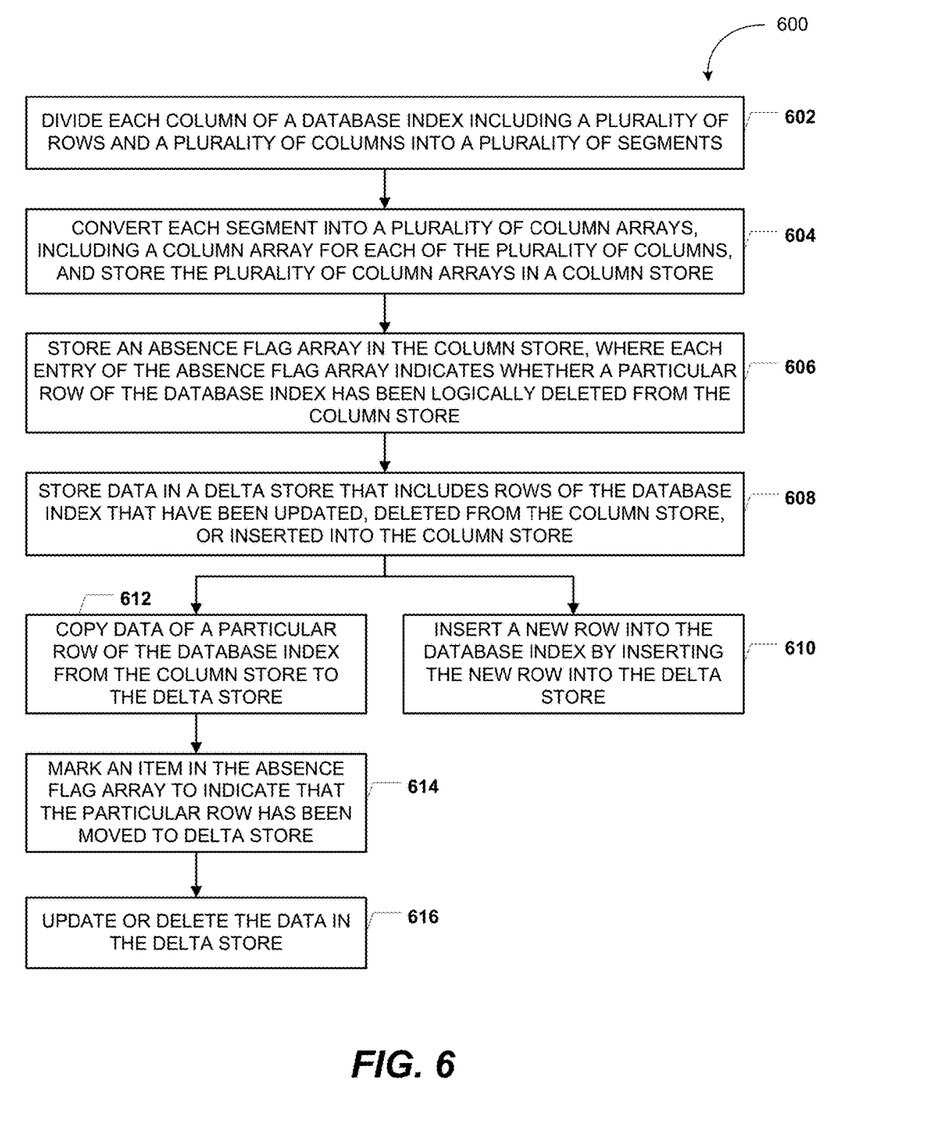
FIG. 6 is flow diagram to illustrate another particular embodiment of a method of columnar storage of a database index.

FIG. 6 depicts another particular embodiment of a method 600 of columnar storage of a database index. In a particular embodiment, operation of the method 600 may be illustrated with reference to FIGS. 1-2.

The method 600 includes dividing a database index that includes a plurality of rows and a plurality of columns into a plurality of segments, at 602. For example, in FIG. 1, the database index 110 may be divided into the segments 111-113. The method 600 also includes converting each segment into a plurality of column arrays, including a column array for each of the plurality of columns, and storing the plurality of column arrays in a column store, at 604. For example, in FIG. 1, the segments 111-113 may be converted into the plurality of column arrays 120 and the plurality of column arrays 120 may be stored in the column store 130.

The method 600 further includes storing an absence flag array in the column store, at 606. Each entry of the absence flag array may indicate whether a particular row of the database index has been logically deleted from the column store. For example, in FIG. 1, the absence flag arrays 134 may be stored at the column store 130.

The method 600 includes storing data in a delta store that includes rows of the database index that have been updated, deleted from the column store, or inserted into the column store, at 608. For example, updated, deleted, and inserted rows of the database index 110 may be stored at a delta store. In an illustrative embodiment, the delta store is the delta store 220 of FIG. 2.

The method 600 may include inserting a new row into the database index by inserting the new row into the delta store, at 610. For example, referring to FIG. 2, a new row may be inserted into the delta store 220. Alternately, the method 600 may include copying data of a particular row of the database index from the column store to the delta store, at 612. For example, referring to FIG. 2, data of a particular row may be moved from the column store 210 to the delta store 220.

When the operation is a delete or update operation, the method 600 may include marking an item in the absence flag array to indicate that the particular row has been moved to the delta store, at 614. For example, referring to FIG. 2, an item in the absence flag arrays 134 may be marked. The method 600 may in addition include updating or deleting the target rows of the operation in the delta store, at 616. For example, referring to FIG. 2, an item in the absence flag arrays 134 may be marked and the data in the delta store 220 may be updated.

Figure 7:
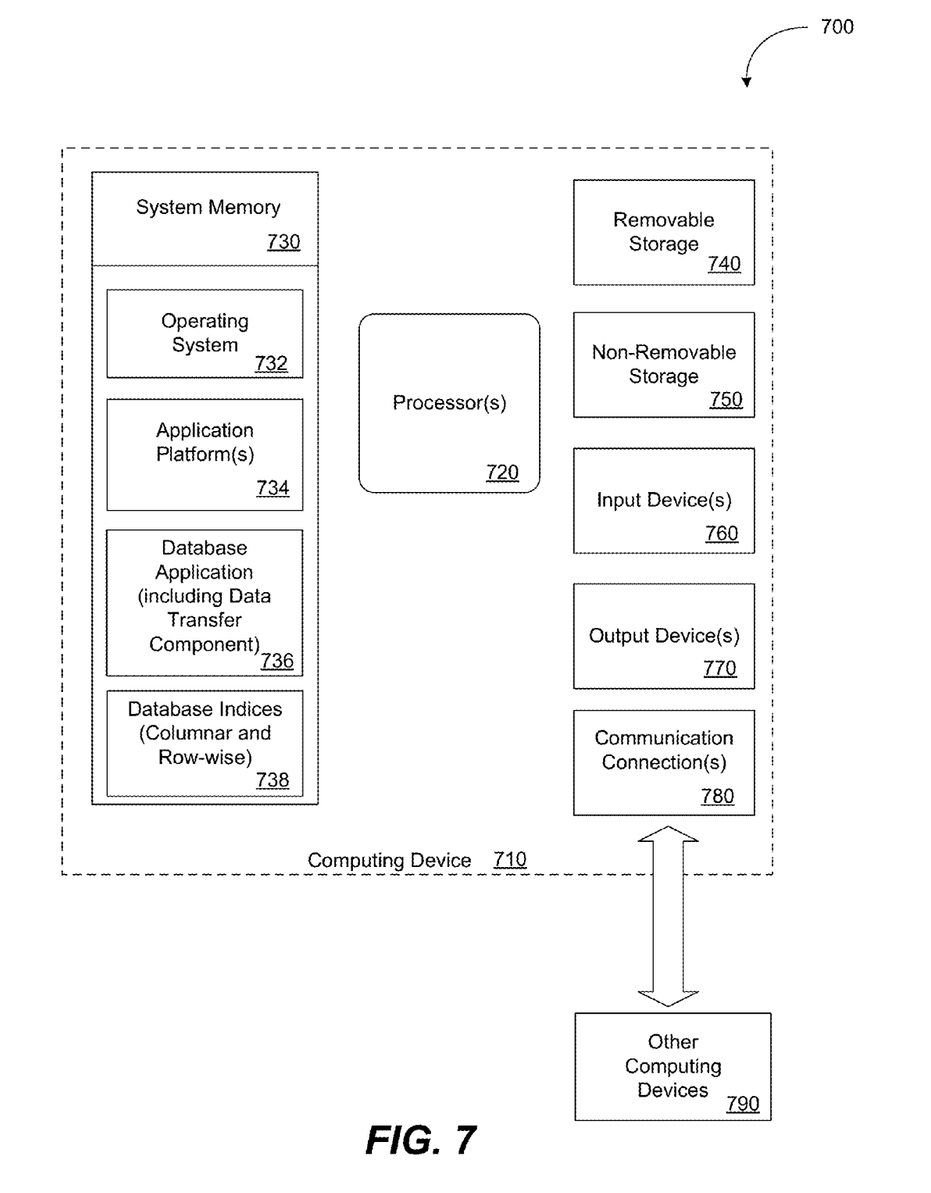
FIG. 7 is a block diagram of a computing environment including a computing device operable to support embodiments of computer-implemented methods, computer program products, and system components as illustrated in FIGS. 1-6.

FIG. 7 depicts a block diagram of a computing environment 700 including a computing device 710 operable to support embodiments of computer-implemented methods, computer program products, and system components according to the present disclosure. In an illustrative embodiment, the computing device 710 may include one or more of the database index 110 of FIG. 1, the column arrays 120 of FIG. 1, the column store 130 of FIG. 1, the columnar index 200 of FIG. 2, the relational database table 300 of FIG. 3, the query operators 410, 440 of FIG. 4, and the aggregation/merge operators 420, 450, 480 of FIG. 4. Each of the database index 110 of FIG. 1, the column arrays 120 of FIG. 1, the column store 130 of FIG. 1, the columnar index 200 of FIG. 2, the relational database table 300 of FIG. 3, the query operators 410, 440 of FIG. 4, and the aggregation/merge operators 420, 450, 480 of FIG. 4 may include or be implemented using the computing device 710 or a portion thereof.

The computing device 710 includes at least one processor 720 and a system memory 730. Depending on the configuration and type of computing device, the system memory 730 may be volatile (such as random access memory or "RAM"), non-volatile (such as read-only memory or "ROM," flash memory, and similar memory devices that maintain stored data even when power is not provided), or some combination of the two. The system memory 730 typically includes an operating system 732, one or more application platforms 734, one or more applications, and program data. For example, the system memory 730 may include a database application 736 and database indices 738 (e.g., columnar indices and row-wise indices).

In an illustrative embodiment, the database application 736 may include a data transfer component that is configured to move rows of a columnar index from a delta store of the columnar index to a column store of the columnar index. In another illustrative embodiment, the processor 720 may be configured to execute a query processing engine to execute database queries of the database application 736 that reference both columnar database indices and row-wise database indices.

The computing device 710 may also have additional features or functionality. For example, the computing device 710 may also include removable and/or non-removable additional data storage devices such as magnetic disks, optical disks, tape, and standard-sized or flash memory cards. Such additional storage is illustrated in FIG. 7 by removable storage 740 and non-removable storage 750. Computer storage media may include volatile and/or non-volatile storage and removable and/or non-removable media implemented in any technology for storage of information such as computer-readable instructions, data structures, program components or other data. The system memory 730, the removable storage 740 and the non-removable storage 750 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 710. Any such computer storage media may be part of the computing device 710.

The computing device 710 may also have input device(s) 760, such as a keyboard, mouse, pen, voice input device, touch input device, etc. Output device(s) 770, such as a display, speakers, printer, etc. may also be included. The computing device 710 also contains one or more communication connections 780 that allow the computing device 710 to communicate with other computing devices 790 over a wired or a wireless network.

It will be appreciated that not all of the components or devices illustrated in FIG. 7 or otherwise described in the previous paragraphs are necessary to support embodiments as herein described. For example, the removable storage 740 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer system, comprising:
   at least one processor;
   at least one memory storing a columnar index associated with a single relational database table, the columnar index comprising:
      a column store comprising a plurality of rows of the columnar index stored in a column-wise fashion, wherein the columnar index associated with the single relational database table is divided into a plurality of segments, wherein individual segments of the plurality of segments correspond to individual subsets of a plurality of rows of the single relational database table, and wherein the column store includes a plurality of column arrays for the individual segments of the plurality of segments; and
      a delta store comprising particular rows of the columnar index that have been updated or deleted stored in a row-wise fashion,
   wherein the computer system is configured to:
      for individual segments of the plurality of segments, store respective absence flag arrays in the column store, wherein the respective absence flag arrays include flags corresponding to individual rows of a corresponding segment, and wherein the respective absence flag arrays indicate which rows of the corresponding segment have been logically deleted from the column store;
      in response to an update for a first row of a first segment, in a first absence flag array corresponding to the first segment, set a first flag identifying the first row;
      in response to a delete for a second row of the first segment, in the first absence flag array corresponding to the first segment, set a second flag identifying the second row; and
      in response to a query, execute a query processing engine configured to execute the query by concurrently executing:
         a first query operator on the column store in a column-wise fashion, and
         a second query operator on the delta store in a row-wise fashion.

2. The computer system of claim 1, wherein the computer system is further configured to execute a data transfer component to move a third row of the columnar index from the delta store to the column store.

3. A method, comprising:
   dividing a database index for a single relational database table into a plurality of segments, wherein the database index comprises a plurality of rows and a plurality of columns, and wherein individual segments comprise a subset of the plurality of rows of the database index;
   converting the individual segments into a plurality of column arrays, wherein the plurality of column arrays includes a column array for each of the plurality of columns;
   for the individual segments of the plurality of segments, storing the plurality of column arrays in a column store;
   storing data in a row-wise fashion in a delta store comprising rows of the column store that have been updated or deleted;
   for the individual segments of the plurality of segments, storing at least one respective absence flag array in the column store, wherein the at least one respective absence flag array includes individual flags corresponding to individual rows of a corresponding segment, and wherein the at least one respective absence flag array indicates which rows of the corresponding segment have been logically deleted from the column store;

in response to an update for a first row of a first segment, in a first absence flag array corresponding to the first segment, setting a first flag identifying the first row;

in response to a delete for a second row of the first segment, in the first absence flag array corresponding to the first segment, setting a second flag identifying the second row; and in response to a query, concurrently executing:
 a first query operator on the column store in a column-wise fashion, and
 a second query operator on the delta store in a row-wise fashion.

4. The method of claim 3, wherein the column store is stored as a second relational database table and wherein each of the plurality of column arrays is stored as a row of the second relational database table.

5. The method of claim 4, wherein rows of the second relational database table that represent column arrays of the same column of the database index are clustered together in the second relational database table.

6. The method of claim 3, wherein:
updating a particular row from the column store includes:
 copying the particular row from the column store to the delta store;
 marking an entry in an absence flag array that corresponds to the particular row; and
 updating the particular row at the delta store; and
deleting the particular row from the column store includes marking the entry in the absence flag array that corresponds to the particular row.

7. The method of claim 3, further comprising inserting a new row into the database index by inserting the new row into the delta store.

8. The method of claim 3, further comprising converting rows stored in the delta store into one or more additional column arrays, storing the one or more additional column arrays in the column store, and removing the converted rows from the delta store.

9. The method of claim 8, wherein the conversion is performed in response to at least one of: determining that a number of rows in the delta store is greater than a threshold, determining that a time period has elapsed, or receiving a user command.

10. The method of claim 3, further comprising performing a particular query that references a columnar index of the database index.

11. The method of claim 10, wherein one or more column arrays used for processing the particular query is copied into a contiguous portion of a memory cache.

12. The method of claim 10, wherein performing the particular query comprises:
executing the particular query with respect to the column store to generate first partial results;
executing the particular query with respect to the delta store to generate second partial results; and
combining the first partial results and the second partial results.

13. The method of claim 10, wherein performing the particular query comprises:
converting the delta store to one or more additional column arrays; and
executing the particular query with respect to the additional column arrays.

14. The method of claim 3, further comprising, in response to the query:
filtering out data from results of the first query operator based on the absence flag arrays; and
aggregating the filtered results of the first query operator and results of the second query operator.

15. The method of claim 3, further comprising:
in response to the update for the first row of the first segment, copying the first row from the column store to the delta store; and
in response to the delete for the second row of the first segment, copying the second row from the column store to the delta store.

16. The method of claim 15, further comprising:
in response to the update for the first row of the first segment, deleting the first row from the column store; and
in response to the delete for the second row of the first segment, deleting the second row from the column store.

17. The method of claim 3, further comprising independently compressing each of the column arrays for each of the segments in the column store.

18. The method of claim 17 wherein the compressed column arrays occupy different amounts of storage space in the column store.

19. The method of claim 17, wherein compressing each of the column arrays includes application of a bit packing algorithm, a dictionary compression algorithm, a run-length encoding algorithm, or any combination thereof.

20. The method of claim 3, wherein subsets of the rows are mutually disjoint.

21. The method of claim 5, wherein, for each segment of the plurality of segments:
the at least one respective absence flag array includes a plurality of bit locations corresponding respectively to the rows of the segment; and
for each bit location of the bit locations, a first predetermined value at the bit location indicates logical deletion of the corresponding row from the column store.

22. A data storage device comprising instructions that, when executed by a computer, cause the computer to:
divide a database index for a single relational database table into a plurality of segments, wherein the database index comprises a plurality of rows and a plurality of columns, and wherein individual segments comprise a subset of the plurality of rows of the database index;
convert the individual segments into a plurality of column arrays, wherein the plurality of column arrays includes a column array for each of the plurality of columns;
for the individual segments of the segments, store the plurality of column arrays in a column store;
store data in a row-wise fashion in a delta store comprising rows of the column store that have been updated or deleted;
for the individual segments of the plurality of segments, store at least one respective absence flag array in the column store, wherein at least one the respective absence flag array includes individual flags corresponding to individual rows of a corresponding segment, and wherein the at least one respective absence flag array indicates which rows of the corresponding segment have been logically deleted from the column store;

in response to an update for a first row of a first segment, in a first absence flag array corresponding to the first segment, set a first flag identifying the first row;

in response to a delete for a second row of the first segment, in the first absence flag array corresponding to the first segment, set a second flag identifying the second row; and in response to a query, concurrently execute:
  a first query operator on the column store in a column-wise fashion, and
  a second query operator on the delta store in a row-wise fashion.

* * * * *